United States Patent [19]

Kawamura

[11] 4,184,527

[45] Jan. 22, 1980

[54] DEVICE FOR COLLECTING OIL FLOATING ON THE SURFACE OF WATER

[76] Inventor: Akinobu Kawamura, Kouri-danchi A3-107, 2-ban, 2-chome, Kourigaoka, Hirakata-shi, Osaka, Japan

[21] Appl. No.: 885,270

[22] Filed: Mar. 10, 1978

[30] Foreign Application Priority Data

Mar. 10, 1977 [JP] Japan .................................. 52/26661

[51] Int. Cl.² .............................................. B65D 1/32
[52] U.S. Cl. ....................................... 150/1; 210/242 S
[58] Field of Search .................. 210/65, 69, 83, 242 S, 210/242 R, 523, DIG. 21; 150/0.5, 1

[56] References Cited

U.S. PATENT DOCUMENTS

| 2,404,418 | 7/1946 | Walker | 150/0.5 |
| 3,044,515 | 7/1962 | Eades | 150/1 |

FOREIGN PATENT DOCUMENTS

| 240097 | 7/1960 | Australia | 150/1 |
| 1404135 | 10/1968 | Fed. Rep. of Germany | 150/0.5 |
| 1281365 | 11/1960 | France | 150/0.5 |
| 857499 | 12/1960 | United Kingdom | 150/0.5 |

Primary Examiner—Ro E. Hart
Attorney, Agent, or Firm—Birch, Stewart, Kolasch & Birch

[57] ABSTRACT

A device for collecting oil floating on the surface of water which comprises a main body made of non-ventilative and flexible sheet material and transformable from a flat configuration to a three dimensional configuration and vice versa, a first nozzle with a valve operatively connected to the main body, and a plurality of hollow elements made of non-ventilative and flexible sheet material and adapted to cooperate with each other to forcibly transform the main body to a three dimensional configuration when compressed air or gas is supplied thereinto through a second nozzle with a valve operatively connected thereto.

12 Claims, 8 Drawing Figures

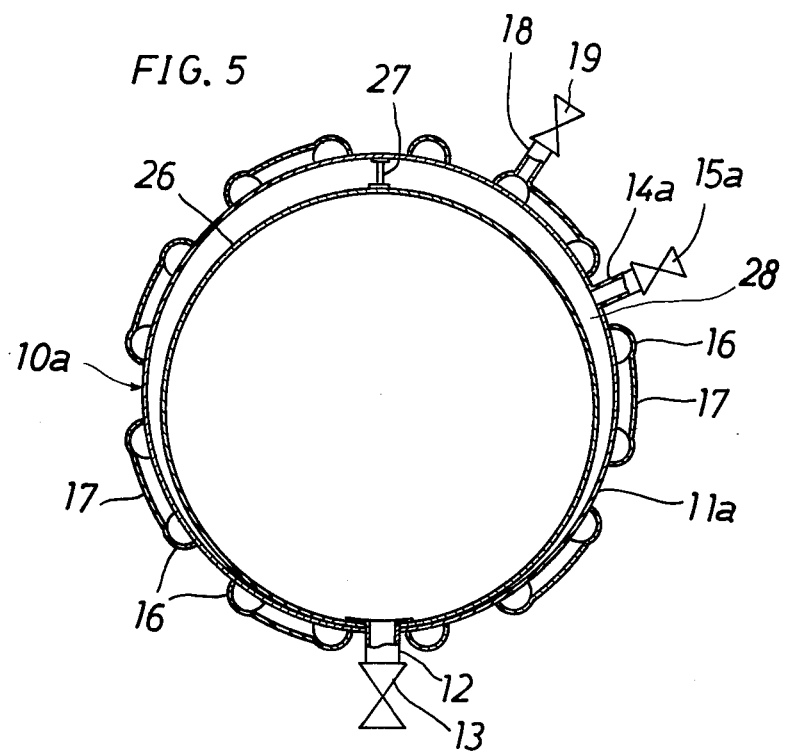
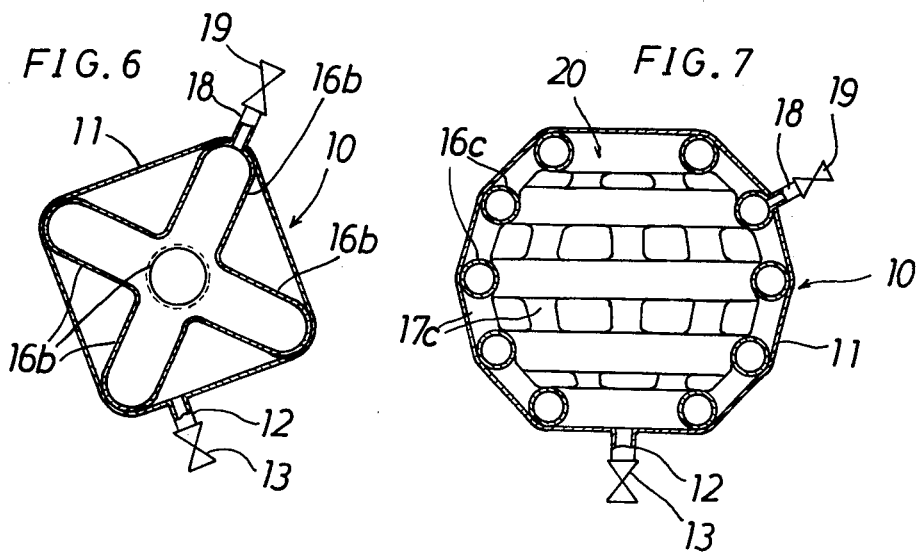

4,184,527

DEVICE FOR COLLECTING OIL FLOATING ON THE SURFACE OF WATER

BACKGROUND AND SUMMARY OF THE INVENTION

The present invention relates to improvements in a device for collecting oil floating on the surface of water thereby to remove the oil from the surface.

Recently an increasing number of mishaps have occurred where oil has flowed out to the sea or like water surface. These mishaps are a result of the wreckage of a tanker or breakdown of coastal oil storage tanks or oil refinery equipment. Thus, in order to separate and remove the floating oil spilt over the surface of water, it is customary to confine the oil to a specific locality of the surface area with floating barriers such as an oil fence immediately posterior to each occurrence of such accidents and thereafter absorb the oil by use of a power apparatus such as a vacuum pump or manually draw up each scoopful of oil into receptacles provided for the purpose, or otherwise place a number of oil absorbing mattings sporadically on the water surface area enclosed with the oil fence or the like thereby selectively absorbing the maximum quantity of the spilt oil.

However, according to the conventional method of removing the oil from the water surface by use of a power apparatus or the like, large and expensive equipments must be provided to pump up the oil regardless to the quantity thereof. Thus, it proves to be economically prohibitive to practically employ the equipments, additionally to the disadvantages that it takes lots of time and trouble to tug them as far as the actual scene of the accidents. Further, since these equipments are driven by means of a power source such as a combustion engine, accidental ignition to the oil that is floating on the surface area is liable to be caused by the engine.

Moreover, when the oil is manually drawn up by use of ladles or the like, or absorbed into the oil absorbing mattings placed afloat on the particular oil floating area, all the quantity of the spilt oil cannot be collected from the surface of water as quickly as desired, and especially even when the water surface is slightly rough, use of such matting is very difficult. Further, even in case the oil is manually drawn up by use of ladles or the like, or absorbed by means of the mattings, an operator's clothes and other neighboring things are inevitably soiled with splashes of the oil or spreads of the oil stuck to the mattings, thereby causing pollution of many other surroundings, thus giving rise to a great difficulty and useless expenditure in cleaning the soiled things for reuse later. Referring also to the mattings only, a great number of them are required subject to the effluent quantity of oil and, once used, doomed to be discarded.

Accordingly, an object of the present invention is to eliminate the above-mentioned deficiencies seen in the conventional oil removing from the surface of water.

Another object of the invention is to provide an improved device for collecting oil on the surface of water having a main body made of non-ventilative and flexible sheet material and transformable from a flatly folded configuration to a three dimensional configuration and vice versa and a plurality of hollow elements also made of non-ventilative and flexible sheet material and inflatable to form a three dimensional rigid truss framework thereby forcibly transforming the main body to a three dimensional configuration so that it can be internally loaded with a negative pressure developing oil sucking function.

A further object of the invention is to provide an improved device for collecting oil on the surface of water wherein a plurality of follow elements are disposed within the main body and arranged so as to form a truss framework structure in order to forcibly transform the main body to a three dimensional configuration.

A still further object of the invention is to provide an improved device for collecting oil on the surface of water which has a diaphragmatic bag disposed within the main body for permitting rapid and upward discharge of the oil collected and contained in the device.

Other objects, advantages and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 5 is a vertical section of further modification of the present invention, in which a diaphragmatic bag is provided; and FIGS. 6 and 7 are somewhat reduced sectional elevations showing still further modifications of the present invention.

DESCRIPTION OF THE PREFERRED EMBODIMENTS

Figure 1:
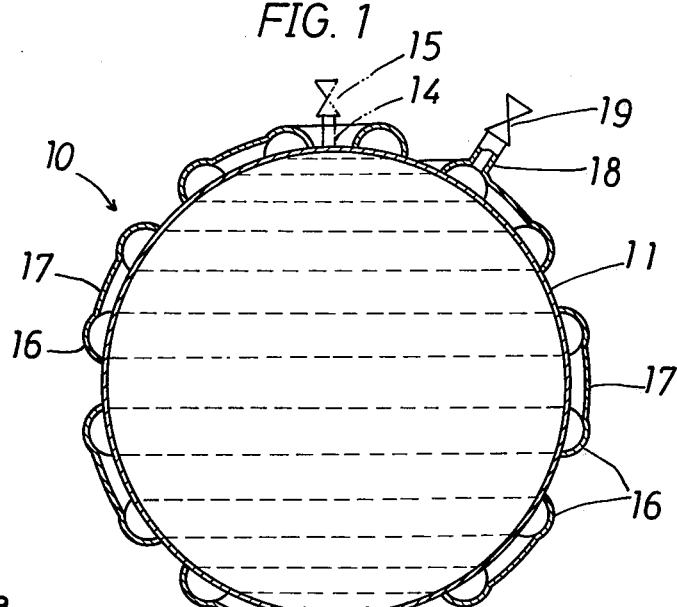
FIG. 1 is a vertical section of a preferred embodiment of the present invention.

Referring now to the drawings, wherein identical reference numerals are used throughout the various views to indicate identical elements, the device 10 of the present invention, with particular reference to FIGS. 1 thru 4, comprises a main body 11 formed of a non-ventilative, flexible and preferably oil-resistant sheet material made of, for example, rubber, synthetic resin or suitable lamination of these. The main body 11 is designed so as to be transformable from a flatly folded configuration to a desired three dimensional configuration, preferably to a spherical or spheroidal configuration, and vice versa during operation to be hereinafter described. The main body is provided with at least one nozzle 12 with a valve 13 adapted to suck and drain oil. If desired, a further nozzle 14 with a valve 15 may be operatively connected to said main body for adjustably feeding and discharging air or gas, as shown in phantom line in FIG. 1.

A plurality of annular hollow elements 16 which from a truss framework are integrally formed on the outer periphery of the main body 11. Each of the hollow elements 16 is made of a non-ventilative, flexible, and preferably oil-resistant sheet material the same as or similar to the material composing said main body 11, and is designed so as to be transformable from a flat configuration to a three dimensional configuration when compressed air or any other suitable pressure gas is filled therein, as particularly shown in FIG. 2. These annular elements 16 are intercommunicated with each other through a plurality of auxiliary hollow elements 17 serving as passageways formed in place so as to interconnect neighboring annular elements 16.

At least one of the annular elements 16 is provided with a nozzle 18 having a valve 19 adapted to feed therethrough a sufficient quantity of compressed air or any other suitable pressure gas into the elements 16, 17, so that they can be inflated to form a rigid truss frame structure and simultaneously therewith the main body 11 is forced to inflate in the three dimensional directions to form a global or any other suitable predetermined three dimensional configuration. The whole structure of the device 10 including the main body 11 and the hollow elements 16, 17 is designed so that it can be totally folded into a substantially flat configuration by either discharging the confined air or gas out of the hollow elements 16, 17 through the nozzles 12 and/or 14 or otherwise connecting one or both of said nozzles to a known vacuum pump (not shown) so as to let the air or gas out of the elements 16, 17.

Figure 1A:
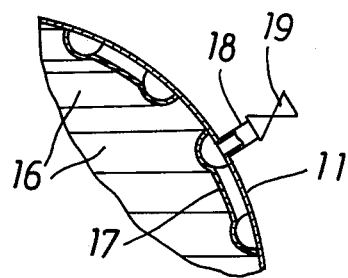
FIG. 1a is a fragmentary section showing a slight modification from the embodiment shown in FIG. 1.
Figure 2:
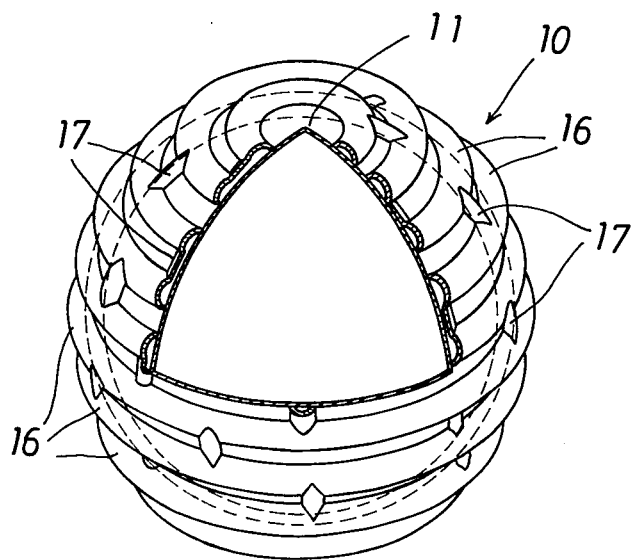
FIG. 2 is a perspective view of the embodiment shown in FIG. 1, partly broken away for clarity.
Figure 3:
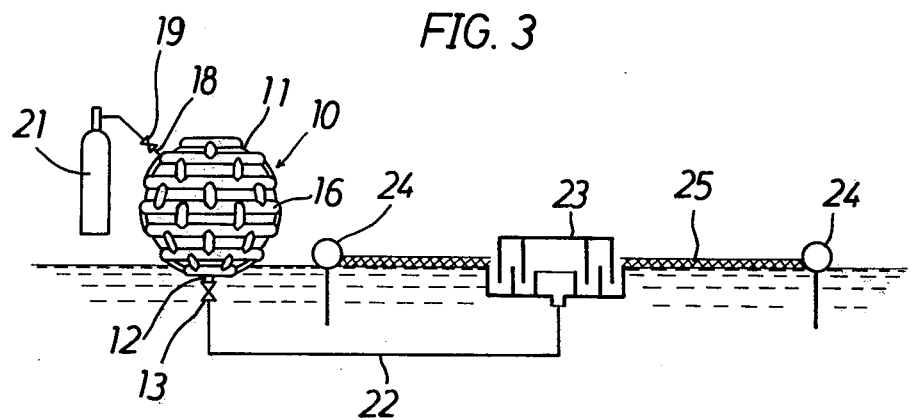
FIG. 3 is a schematic illustration showing the operational manner of the device of the present invention.
Figure 4:
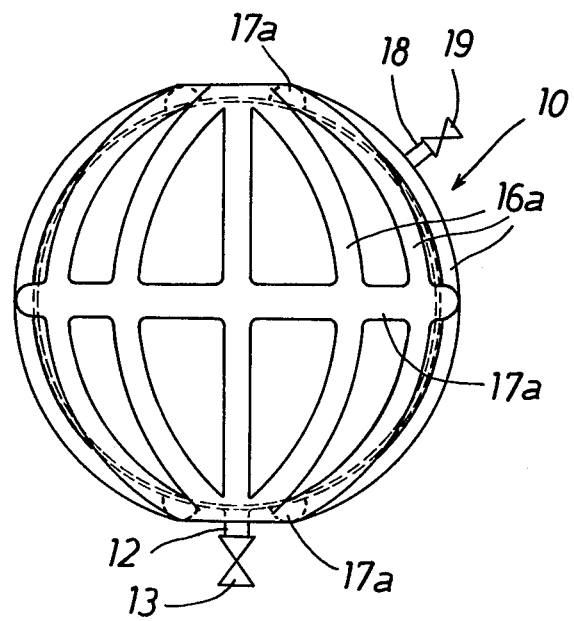
FIG. 4 is an elevational view showing another embodiment of the present invention, in which the hollow elements are arranged in a different manner.

It will be readily apparent to those skilled in the art that the configuration and arrangement of the hollow elements may be varied in many ways. For instance, in place of the latitudinal arrangement of the hollow elements 16 as illustrated in FIGS. 1 and 2, they may be arranged so as to extend longitudinally as shown in FIG. 4. The particular embodiment shown in FIG. 4 includes such modified arrangement thereof, wherein a plurality of elongated hollow elements 16a are formed on the external periphery of the main body 11 in such a manner that they extend longitudinally along with the curved outer surface of the global body 11. These elongated hollow elements 16a are intercommunicated with each other through a plurality of further auxiliary elements 17a of annular shape which are latitudinally disposed at the vertically opposed parts and the equatorial part of the global body 11, respectively. The global body 11 is provided with at least one nozzle 12 with a valve 13 for sucking and draining oil. At least one nozzle 18 with a valve 19 for feeding and discharging air or gas is likewise connected either to one of the elongated elements 16a or to one of the annular elements 17a for the purpose described in the foregoing. As a further modification of the arrangement of the hollow elements, a meshnetting shape or a honeycomb shape truss arrangement may be utilized. It should be understood that the hollow elements, for instance, in the form of elements 16, 17, may be formed on the internal periphery of the main body 11 as particularly shown in FIG. 1a.

The hollow elements may be formed so as to present an independent structure not integral with the main body 11. One example thereof is shown in FIG. 7, wherein a plurality of annular hollow elements 16c are latitudinally arranged and connected together with a plurality of auxiliary hollow elements 17c. These hollow elements 16c, 17c are intercommunicated with each other and adapted to cooperate to form an independent truss framework structure 20, which is disposed within the main body 11. The nozzle 18 with a valve 19 is operatively connected to at least one of said elements 16c or 17c, said nozzle 18 being adapted to project out of the main body 11. At least one oil sucking and draining nozzle 12 having a valve 13 is connected to said main body 11. Thus, when compressed air or gas is supplied into the main body 11 through said nozzle 18, the hollow elements 16c, 17c cooperate to construct a rigid frame structure within the main body and, in turn, the main body is forcibly transformed to a three dimensional configuration.

Further in particular case, the hollow elements may be arranged so as to form a truss structure within the main body 10. One example of such truss structure is shown in FIG. 6, wherein a plurality of elongated tubular elements 16b are arranged crosswise in the three dimensional directions and intercommunicated with each other. The nozzle 18 with a valve 19 is operatively connected to one free end of the tubular elements 16b in order to feed and discharge air or gas therethrough. The nozzle 12 with a valve 13 is operatively connected to the main body 11 in order to suck and drain oil therethrough. Thus, when compressed air or any other suitable gas is fed into the hollow elements 16b, they are inflated to provide a rigid truss structure which, in turn, forcibly transforms the main body 11 to a three dimensional configuration as shown in FIG. 6. Incidentally, it will be readily apparent that the truss structure applicable to this particular embodiment may be varied in many ways.

If desired, the nozzle 18 may be provided beforehand with a small-sized portable bomb 21 (FIG. 3) filled with air or gas compressed enough to pump up said hollow elements, so that they can start to be inflated without losing time merely by releasing a valve (not shown) on the bomb 21, thereby eliminating the trouble in connecting the nozzle 18 to a certain pressure source such as an air compressor, a gas bomb or the like available on the actual spot. Also if desired, a balancing weight (not shown) may be provided so that the oil sucking nozzle 12 can maintain its downward position during oil sucking operation.

In operation, the oil collecting device 10 of the invention may be carried in the flatly folded form to the actual spot where oil leakage occurred. At that spot, with the valve 15 (FIG. 1) closed, the nozzle 12 is connected through a suction hose or any other appropriate conduit means 22 to a known oil collecting apparatus 23 or such a floatable skimmer means as disclosed in U.S. Pat. No. 3,534,858 placed afloat in the area enclosed with an oil fence or the like barrier means 24, and thereafter the hollow elements are supplied with a sufficient quantity of compressed air or gas from a bomb or any other available pressure source through the nozzle 12 in order to forcibly transform the main body 11 into a predetermined three dimensional configuration along with the inflation of the hollow elements, whereby the main body 11 is internally loaded with a negative pressure developing desired oil sucking function. Thus, by releasing the valve 13 of the nozzle 12, the floating oil 25 (FIG. 3) is sucked in sequence into the main body, accompanied in most cases with a certain amount of water.

In case the quantity of oil spilt on the water surface is too great, the oil collecting device 10 to be placed afloat on the oil floating area may be increased in number in accordance with the quantity of the spilt oil so that the desired quantity of oil may be collected. The device 10 may preferably placed afloat externally of the oil fence 24 or the like barrier means in the manner as described in the foregoing. The device 10 of the invention may also be placed afloat internally of the oil fence 20 or the like. In this latter case, it is advantageous in that said oil collecting apparatus 23, said skimmer means or the like auxiliary device or apparatus may be dispensable since the floating oil can be directly sucked into the main body 11 through the nozzle 12, while it invites such a disadvantage that the device 10 is inevitably exposed to undesirable contamination by the floating oil and, as a result, cleaning of the device is required for reuse after the operation.

After the main body 11 contains a quantity of oil, the valve 13 of the nozzle 12 is closed and the hose 22, if applied, is detached from the nozzle 12. Thereafter, the device 10 may be towed afloat on the surface of water or carried by an operation boat to a nearby harbor facilities, where the valve 19 is released to discharge the confined air out of the hollow elements until the whole device 10 is completely reduced in volume to a flattened configuration thereby draining the contained oil from the main body 11 through the nozzle 12 into a desired storage tank or reservoir. In case the further nozzle 14 with a valve 15 is provided with the main body 11, by feeding compressed air or gas into the main body 11, the oil contained therein can be forcibly pushed out of the main body 10, permitting rapid and/or upward draining.

FIG. 5 illustrates a further modified embodiment of the present invention, wherein a diaphragmatic bag 26 is provided within a main body 11a of which construction may be basically the same as the main body 10 described in the foregoing. Said diaphragmatic bag 26 may be made of non-ventilative, flexible and preferably oil-resistant sheet material the same as or similar to the material composing said main body, and designed so as to be transformable from a flattened configuration to a three dimensional configuration and vice versa. The diaphragmatic bag 26 has at least one nozzle 12 with a valve 13 connected thereto for sucking and draining oil. The nozzle 12 is adapted to extend out of the main body 10a so as to be communicable with the atmosphere.

Said main body 11a comprises a nozzle 14a having a valve 15a communicating with an internal space 28 defined by and formed between the main body 11a and the diaphragmatic bag 26. Preferably, the bag 26 may be connected to the main body 11a by means of one or more strings or other suitable tying means 27 preferably at a location opposite to said nozzle 12 for the purpose to be hereinafter described. On the periphery of the main body 11a are provided a plurality of hollow elements 16, 17 intercommunicated with each other in the manner as described in the foregoing. One of said hollow elements 16, 17 is provided with a nozzle 18 having a valve 19 for feeding compressed air or gas into the hollow elements 16, 17. Thus, the whole device 10a is foldable to a flat configuration by releasing the valve 19 of the nozzle 18, the valve 15a of the nozzle 14a and the valve 13 of the nozzle 12, respectively, and thereafter forcibly pressing the whole body 11a or otherwise by connecting each of said nozzles to a vacuum pump in order to exhaust the inner air or gas from the whole device 11a. It is convenient to transfer the devices of the invention in this flattened form to a desired place.

The operational manner of this modified device 10a of the invention is substantially the same with that of the preceding embodiments. However, the difference exists in that oil is sucked in or drained out not through the nozzle 14a of the main body 11a but through the nozzle 12 of the diaphragmatic bag 26. More particularly to the oil sucking operation, as the hollow elements 16, 17 are inflated under the supply of compressed air or gas to form a three dimensional rigid truss frame structure, the main body 11a is simultaneously transformed up to a substantially global shape, so that the main body 11a is internally loaded with a negative pressure. At the same time, the diaphragmatic bag 26 is also forcibly transformed to a three dimensional shape so that it is likewise internally loaded with a negative pressure to perform the desired oil sucking function.

While, in oil draining operation, by feeding compressed air or gas from the nozzle 14a into said internal space 28 between the main body 11a and the diaphragmatic bag 26, the dimension of said bag 26 is forced to be reduced enough, so that the oil contained in the bag 26 is pressed or squeezed out through the nozzle 12 under such a pressure substantially equal to the pressure of the compressed air or gas. By provision of a tying means 27, the diaphragmatic bag 26 can be prevented from being undesirably bent midway at any portion to block the oil flow as the bag 26 is reduced to a flattened configuration. As a result, the oil is permitted to be smoothly drained out. Thus, according to this modified embodiment, it is possible to drain the contained oil up to a desired storage tank or reservoir installed at a higher place than the elevation at which the nozzle 12 of the bag 26 is positioned. Further, this modified embodiment permits efficiency in draining since the time required for the purpose can be considerably reduced.

Further in a particular case, an independently formed framework composed of the hollow elements, for example in the form of such a truss framework 20 as illustrated in FIG. 7, may be disposed within said space 28 formed between the diaphragmatic bag 26 and the main body 11a which is not provided with the hollow elements 16, 17, so that it can forcibly transform said main body to a three dimensional configuration when compressed air or gas is fed therein. In this case, the function and operational manner of the diaphragmatic bag 26 and the nozzles 12, 14 are substantially the same with those of the embodiment shown in FIG. 5, and therefore the detailed description thereof is herein omitted.

As can be readily apparent from the foregoing detailed description, the oil collecting device of the invention has the following advantageous features that the whole device can be folded to a substantially flat and less bulky configuration for easy transportation and storage with less space which especially permits reserving or storing the devices on board a ship for ready use; that the device is easy to use without skill; that by utilizing a portable bomb as a pressure source the device can start to carry out the desired oil collecting function without losing time; that by use of the device of the invention the spilt oil can be recovered economically since a large and expensive equipment or apparatus is not required; that the device of the invention is applicable to various scales of accidental oil leakage by merely adjusting the number of the devices to be placed afloat on the oil floating area; that the use of the device of the invention permits more efficient oil collection without soiling an operator's clothes or the like, as compared to the manual operation by use of scooping devices or absorbing mattings; that the device of the invention can work even when the water surface is not very calm since it is floatable on the water surface; that the use of the device of the invention never invites accidental ignition to the floating oil; that the device of the invention containing collected oil can be carried by towing them afloat on the water surface to a desired coastal place; that the collected oil contained in the device of the invention can be easily discharged into a desired storage tank or reservoir by releasing a valve; that by providing the diaphragmatic bag within the main body the collected oil in the device of the invention can not only be drained rapidly but also be discharged up to a higher place than the place where the device is positioned; and that the device of the invention can be used repeatedly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A device for collecting oil floating on the surface of water which comprises:
    a main body made of non-ventilative and flexible sheet material and transformable from a flatly folded configuration to a three dimensional configuration and vice versa;
    at least one first nozzle for sucking and draining oil operatively connected to said main body;
    a plurality of hollow elements made of non-ventilative and flexible sheet material and transformable from a flat configuration to a three dimensional configuration and vice versa;
    at least one second nozzle for feeding and discharging air or gas operatively connected to one of said hollow elements and for selecting connecting said hollow elements to the atmosphere; and
    said plurality of hollow elements being adapted to cooperate with each other to form a truss structure to forcibly transform said main body to a three dimensional configuration when compressed air or gas is supplied into said elements.

2. The device as defined in claim 1, wherein said hollow elements are formed integral with said main body.

3. The device as defined in claim 2, wherein said main body is designed so as to be transformable from a flattened configuration to a substantially global configuration and vice versa, and said plurality of hollow elements include annular hollow elements arranged latitudinally on an external periphery of said main body, said plurality of hollow elements being intercommunicated with each other through at least one auxiliary hollow element made of non-ventilative and flexible sheet material and transformable from a flat configuration to a three dimensional configuration and vice versa.

4. The device as defined in claim 2, wherein said main body is designed so as to be transformable from a flattened configuration to a substantially global configuration and vice versa, and said plurality of hollow elements include elongated elements arranged longitudinally on the external periphery of said main body, said plurality of hollow elements being intercommunicated with each other through at least one auxiliary hollow element made of non-ventilative and flexible sheet material and transformable from a flat configuration to a three dimensional configuration and vice versa.

5. The device as defined in claim 2, wherein said plurality of hollow elements are formed integrally on an internal periphery of said main body.

6. The device as defined in claim 1, wherein said main body is provided with at least one third nozzle for feeding and discharging air or gas.

7. The device as defined in claim 1, wherein said plurality of hollow elements are constructed independently of said main body and disposed within said main body so as to forcibly transform said main body to a three dimensional configuration when compressed air or gas is supplied into said elements.

8. The device as defined in claim 7, which includes a plurality of said hollow elements connected and intercommunicated with each other through a plurality of said auxiliary hollow elements, at least one said second nozzle for feeding and discharging air or gas operatively connected to one of said hollow elements and adapted to project outwardly from said main body, and said hollow elements being arranged so as to construct a three dimensional rigid framework when compressed air or gas is supplied thereinto.

9. A device as defined in claim 1, wherein said plurality of hollow elements include tubular elements connected together in communication with each other.

10. A device for collecting oil floating on the surface of water which comprises
    a main body made of non-ventilative and flexible sheet material and transformable from a flatly folded configuration to a three dimensional configuration and vice versa,
    at least one first nozzle for feeding and discharging air or gas operatively connected to said main body,
    a plurality of hollow elements made of non-ventilative and flexible sheet material and transformable from a flat configuration to a three dimensional configuration and vice versa,
    at least one second nozzle for feeding and discharging air or gas operatively connected to one of said hollow elements,
    a diaphragmatic bag made of non-ventilative and flexible sheet material and transformable from a flattened configuration to a three dimensional configuration and vice versa,
    said diaphragmatic bag being disposed within said main body,
    at least one third nozzle for sucking and draining oil operatively connected to said diaphragmatic bag and adapted to project outwardly from said main body,
    said plurality of hollow elements being adapted to cooperate with each other to forcibly transform said main body to a three dimensional configuration when compressed air or gas is supplied into said elements, and said diaphragmatic bag being adapted to be forcibly transformed to a three dimensional configuration as said main body is forcibly transformed to a three dimensional configuration.

11. The device as defined in claim 10, wherein at least one tying means is internally provided for connecting said diaphragmatic bag to said main body.

12. The device as defined in claim 10, wherein said plurality of hollow elements are constructed independently of said main body and disposed within said main body, at least one said second nozzle for feeding and discharging air or gas being operatively connected to one of said hollow elements and adapted to project outwardly from said main body, said plurality of hollow elements being arranged so as to form a three dimensional rigid framework when compressed air or gas is supplied into said elements, said diaphragmatic bag being disposed within said framework composed of said hollow elements in such a manner that it can be forcibly transformed to a three dimensional configuration as said main body is forcibly transformed to a three dimensional configuration along with transformation of said hollow elements to a three dimensional rigid framework, and at least one said third nozzle for sucking and draining oil being cooperatively connected to said diaphragmatic bag and adapted to project outwardly from said main body.

* * * * *